United States Patent [19]

Faulk, Jr. et al.

[11] Patent Number: 6,038,600
[45] Date of Patent: Mar. 14, 2000

[54] METHOD AND SYSTEM FOR AUTOMATIC DETECTION OF BRIDGED AND REPEATED NETWORK DEVICE CONNECTIONS

[75] Inventors: Robert L. Faulk, Jr., Roseville; Karen E. Kimball, Sacramento, both of Calif.

[73] Assignee: Hewlett-Packard Company, Palo Alto, Calif.

[21] Appl. No.: 08/895,119

[22] Filed: Jul. 16, 1997

[51] Int. Cl.[7] ................................... G06F 13/00
[52] U.S. Cl. .................... 709/224; 709/235; 709/238; 709/244
[58] Field of Search ................... 320/254, 255, 320/256; 709/220, 221, 222, 223, 226, 229, 235, 238, 244; 707/10

[56] References Cited

U.S. PATENT DOCUMENTS

| | | | |
|---|---|---|---|
| 5,297,138 | 3/1994 | Black | 370/254 |
| 5,345,585 | 9/1994 | Lyer et al. | 707/2 |
| 5,421,024 | 5/1995 | Faulk, Jr. et al. | 709/223 |
| 5,521,902 | 5/1996 | Ferguson | 370/248 |
| 5,600,638 | 2/1997 | Bertin et al. | 370/351 |
| 5,682,479 | 10/1997 | Newhall et al. | 709/242 |
| 5,784,557 | 7/1998 | Oprescu | 709/220 |
| 5,802,319 | 9/1998 | Faulk, Jr. et al. | 709/249 |
| 5,821,937 | 10/1998 | Tonelli et al. | 345/356 |
| 5,859,852 | 1/1999 | Moura et al. | 370/449 |
| 5,909,431 | 6/1999 | Kuthyar et al. | 370/260 |
| 5,920,698 | 7/1999 | Ben-Michael et al. | 709/224 |

*Primary Examiner*—Frank J. Asta
*Assistant Examiner*—Jason D. Cardone

[57] ABSTRACT

An "intelligent network agent" software application for network devices (such as bridges or repeaters) which have one or more network links automatically detects when two or more of the agent's network links are bridged or repeated across. This information can be used elsewhere to automatically configure the network links or for other intelligent applications. Such configuration could include: assigning bridged links to different segments (to maximize the connectivity offered by the bridging and to prevent looping); setting up bridged links on a bridge to form a Spanning Tree with another bridge; setting up redundant connections; disabling ports which are causing loops in the network, or other configuration actions.

32 Claims, 5 Drawing Sheets

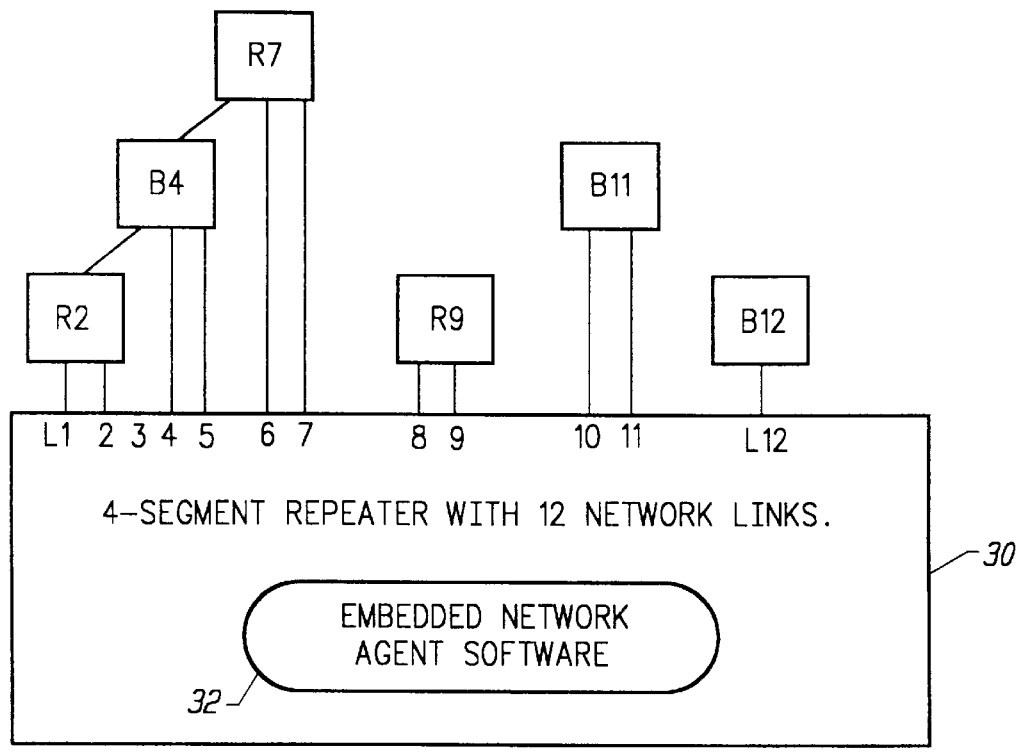

METHOD AND SYSTEM FOR AUTOMATIC DETECTION OF BRIDGED AND REPEATED NETWORK DEVICE CONNECTIONS

BACKGROUND OF THE INVENTION

1. Technical Field

The invention relates to networked computer systems. More particularly, the invention relates to a method and system for detecting bridged or repeated links in multi-segment network devices.

2. Description of the Prior Art

Computer network systems are inherently complex. A significant amount of technical education is required to understand, configure, and maintain any particular type of physical network, such as 10Base-T, Ethernet, Token Ring, or Token Bus networks. As the use of computer networks becomes widespread, new technicians are needed to maintain and operate those networks. These technicians may have little or no knowledge about networks, and even with eventual extensive training may not ever fully understand them.

As a result, software schemes which can configure, maintain, or improve network conditions without requiring the user to have much specific technical knowledge are desirable. "Ease-of-use" and "user-friendly" schemes are often included in software applications that are embedded in, or located external to, the network devices. Such software applications are known as "intelligent network agents."

One challenge facing a network administrator is correctly setting up a network. Setting up a network involves connecting devices together in such a way that they function as the administrator desires. An administrator who does not fully understand the workings of the devices, or the network itself, may not be able to set up the network properly.

The different types of network device connections between network links, along with their location in relation to a given hardware environment, are collectively known as a network's "topology." Knowledge of the topology of a given intelligent network agent's hardware environment has many benefits. For example, this information can be used by the intelligent network agent or by other applications to configure the environment, to make intelligent decisions for the network administrator, or to provide input for other intelligent agent features. The information may also be used to fix or mitigate problems occurring on the network, such as loops caused by multiple connections. Thus, an intelligent network agent which can detect network topology information is of great benefit in assisting the administrator to configure a network correctly.

Presently, the only known software solution in the prior art for automatic detection of network topology is an application-level software solution. Embedded software solutions are not currently known. The application-level software solution is only able to detect "managed" devices which support specific software. Here, a "managed" device must contain some form of intelligent network agent software which controls the device, and in this context must have additional software which responds to informational queries sent over the network by management stations, management software applications, and/or network administrators. This additional software requires a network protocol stack (to receive and translate network packets which might contain such queries) and must be able to respond to the given query (i.e., have a predefined answer to the particular predefined question). Thus, if the device is not managed and/or does not support the specific software, the prior art solution will not work. Furthermore, in a "troubled" network environment the device may not even receive such network queries, or may be too overloaded to respond to them, thus the prior art solution may not work.

The prior art method uses the Simple Network Management Protocol (SNMP) to make specific Management Information Base (MIB) queries to each discovered intelligent network device. If the intelligent network device is able to respond meaningfully to the queries, the returned information is then used to determine what kind of device it is. These queries involve the system group of MIB II, required in all implementations of MIB II.

The System Object Identifier can be requested and then compared against a database identifying the vendor and device-type. Such databases are particular to each software application. Alternatively, information about which Open System Interconnection (OSI) layers are supported by the target device can be requested. OSI uses a layered structure to describe communications and identifies the functions required at each layer for information transfer. In this case, if the device being interrogated replies that it supports OSI Layer 1, it is a repeating device.

For purposes of the discussion herein, a "repeater" is a device that is used to extend the length, topology, or inter-connectivity of a physical cabling medium beyond that imposed by a single cable. Repeaters perform the basic actions of restoring the signal amplitude, waveform, and timing applied to the data signals.

If the device being interrogated replies that it supports OSI Layer 2, it is a bridging device. For purposes of the discussion herein, a "bridge" is a multiport device connecting two or more network segments. When two stations on different network segments communicate with each other, the bridge forwards the packets between the two segments. When the stations are on the same segment, the bridge does not forward the packet to any other segment. The term "switch" can also be used interchangeably with the term "bridge."

Other OSI layers which a device may support are not as specific in the ability for a single device type to be deduced.

The prior art method is limited and not entirely reliable. First, it requires that the interrogated devices support SNMP itself, as well as MIB II. Many devices, especially repeating devices, do not support SNMP. An example of such device is a purely hardware device, as distinguished from a hardware/software device. Devices that do support SNMP cannot always be assumed to support MIB II. Furthermore, the prior art method requires that the network be in a state such that an SNMP reply can be received and processed by the device to be interrogated.

FIG. 1 is a diagram showing a first example of a topology for a hardware environment 10, according to the prior art. In the first example, an intelligent agent software module 12 is embedded within a network hardware device 14. Two network links 16, 18 on the same physical segment connect the network hardware device to a network repeating device 20.

FIG. 2 is a diagram showing a second example of a topology for a hardware environment 22, according to the prior art. In the second example, the two network links 16, 18 on the same physical segment connect the network hardware device 14 to a network bridging device 24.

In both the first and second examples, the physical connections create a loop 26 in the network. When such a loop occurs, it is very difficult or even impossible to exchange information reliably with other network software agents. Some network software agents may cease working altogether. Thus, a scheme which requires parsing information from exchanged encapsulated network packets may not work under such conditions.

It would therefore be an advantage to provide a new method and system for detecting bridging and repeating device connections between links in a network hardware environment which does not require that the attached device have software support. It would be a further advantage if such method and system automatically detected such device connections in both good and bad hardware environments. It would be yet another advantage if such method and system were user-friendly and required no specific action on the part of the network administrator; for example where the detection also provides the means to fix such a bad environment.

SUMMARY OF THE INVENTION

The invention is an "intelligent network agent" software application for network devices (such as bridges or repeaters) which have one or more network links. The invention automatically detects when two or more of the agent's network links are bridged or repeated across. This information can be used elsewhere to configure the network links automatically or for other intelligent applications. Such configuration could include: assigning bridged links to different segments (to maximize the connectivity offered by the bridging and to prevent looping); setting up bridged links on a bridge to form a Spanning Tree with another bridge; setting up redundant connections; disabling ports which are causing loops in the network; or other configuration actions. The invention provides the ability to obtain the information about how the agent's hardware links are connected and requires no action on the part of the user, which is very powerful. In addition, the way in which this information can be used is also very powerful.

The invention provides a solution in which the possibility of physical loops between two or more of a hardware environment's links is evaluated by an intelligent network agent software application. The intelligent network agent can confirm the presence of physical looping, even if the links are not logically looped in a given hardware configuration.

The invention identifies what type of device or devices are governing a physical loop between two or more given links. In a preferred embodiment of the invention, this is accomplished by sending out test packets and noting special qualifiers. An algorithm is used for detection of attached devices. This algorithm discovers the general topology directly connected to the agent's hardware environment. The preferred embodiment of the invention uses an algorithm which is optimized to reduce the number of test packets that must be sent.

The invention detects bridged or repeated connections that are directly attached to a "target" intelligent hardware device. In the preferred embodiment, the agent is fully embedded in that hardware device (FIG. 4). However, in an alternative embodiment, the agent exists remotely (FIG. 4a) and communicates with other software intelligence embedded in the hardware device via an out-of-band (non-network) hardware connection. This out-of-band communication can remain operational even when loops are present in the network. While the target device has some embedded software intelligence in this alternative embodiment, the agent and thus the invention itself is not embedded.

The type of connection noted above can be qualified only when two or more of these connections are causing the target device's hardware links to be bridged or repeated. The potentially looping network configuration is not retained during the attempt to diagnose the loop. To ensure this, the invention uses a hardware environment in which the device is not repeating traffic between input and output link(s). Such an environment could be one that allows buffering or switching of the packets, as for a network bridge, switch, router, or multipoint repeater, or a hardware environment which is a multi-segment repeater (as in the preferred embodiment of the invention). Such environment could also be a hardware environment in which packet characteristics can be determined without absorbing (i.e. forwarding) the packet itself (e.g. where hardware address matching occurs while the link is disabled). These environments allow packets to be sent out one link at a time, preventing collisions with other enabled links. The packet and any other traffic are prevented from looping around while the test is occurring. This increases the ease and reliability of methods, including the prior art SNMP method as well as the invention, for determining whether the same packet is seen on the other link(s).

BRIEF DESCRIPTION OF THE DRAWINGS

FIG. 4 is a diagram showing a first sample topology for a hardware environment according to the invention;

FIG. 5 is a chart of the results from a test for automatically detecting bridged or repeated connections in that first sample topology according to the invention.

DETAILED DESCRIPTION OF THE INVENTION

Figure 1:
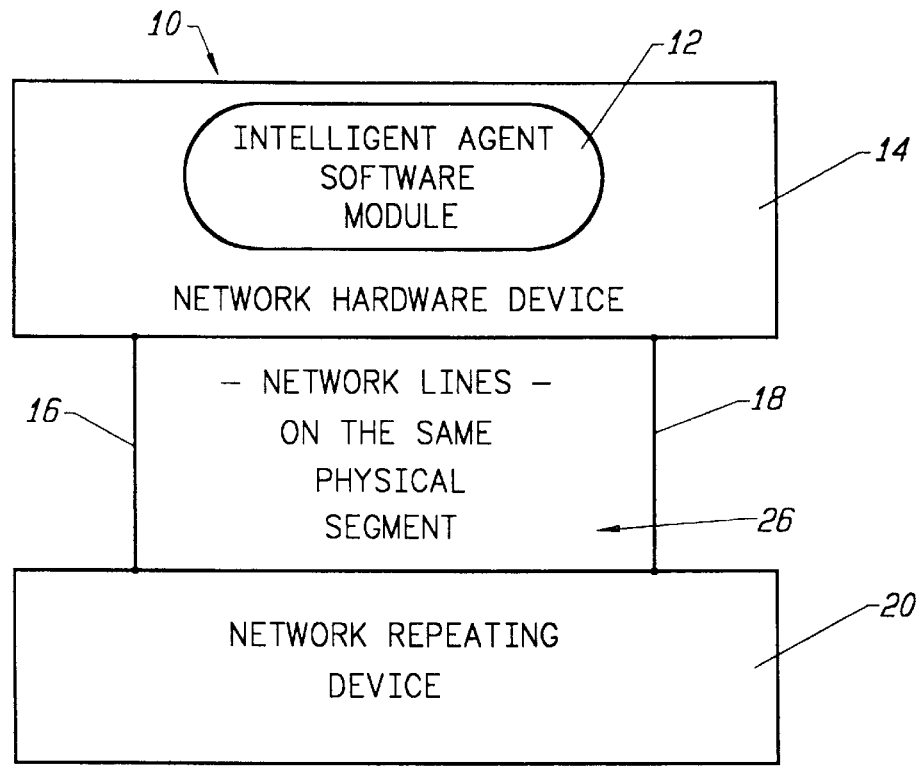
FIG. 1 is a diagram showing a first example of a topology for a hardware environment according to the prior art.
Figure 2:
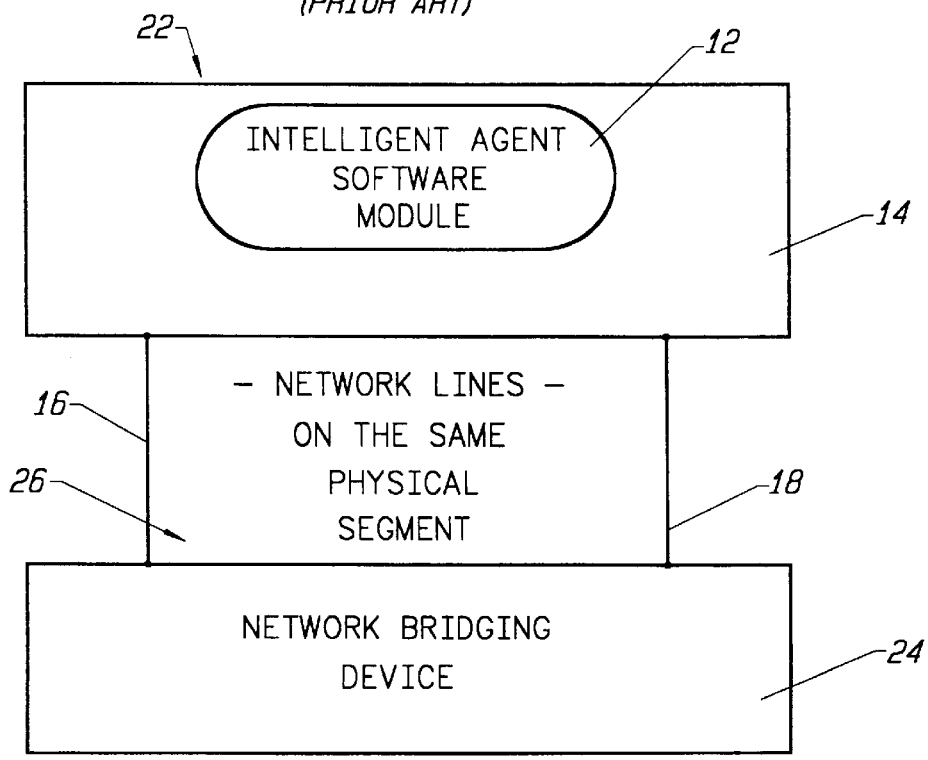
FIG. 2 is a diagram showing a second example of a topology for a hardware environment according to the prior art.

The invention is an "intelligent network agent" software application for network devices (such as bridges, repeaters, or multi-segment repeaters) which have one or more network links. The invention automatically detects when two or more of the agent's network links are bridged or repeated across. This information can be used elsewhere to configure the network links automatically or for other intelligent applications. Such configuration could include: assigning bridged links to different segments (to maximize the connectivity offered by the bridging and to prevent looping); setting up bridged links on a bridge to form a Spanning Tree with another bridge; setting up redundant connections; disabling ports which are causing loops in the network; or other configuration actions. The invention provides the ability to obtain information about how the agent's hardware links are connected and requires no action on the part of the user.

The invention is readily used with existing networks and devices, i.e. Devices attached (either directly or indirectly) to the target device's network hardware environment may be of any known general purpose type and do not require special hardware or software to allow implementation of the invention.

The invention provides a method and system for automatically detecting multiple bridged or repeated device connections to a network device. The presence of bridged or repeated device connections can be indicated by certain conditions or observations. For example, rapidly climbing link counters indicate the possible presence of such loops. Multiple addresses seen on a connected link indicate that a bridge or repeating device may be attached.

In the invention, the possibility of physical loops between two or more of the hardware environment's links is evaluated by an intelligent network agent software application. The intelligent agent can confirm the presence of physical looping, even if the links are not logically looped in a given hardware configuration. For instance, in a redundant link configuration, two hardware links may be attached to the same external device with one link disabled and in standby mode (to be activated if the first link fails). There is a physical loop in such a situation (which the invention detects during testing when it enables both links). However, because the second loop is normally configured as disabled, there is no logical loop.

The invention verifies what type of device is governing a physical loop between two or more given links. In a preferred embodiment of the invention, this is accomplished by sending out test packets and noting special qualifiers.

To test any given connection, a "priming" packet is initially sent out in case a bridging device is directly or remotely attached. This priming packet is needed because the sending address' location may not be updated in any bridging device's address table until after the packet has gone through. Thus, the first packet could be forwarded even though this would not ordinarily occur if the sending address' location had been updated. The priming packet causes bridges to update their address tables and thus enables accurate device testing.

A first test packet with identical SourceAddress (SA) and Destination Address (DA) is then sent out on one link. If this first test packet is received on another link, the presence of a repeating loop is indicated. This is because a connection with a bridge would have filtered the packet rather than forwarded it out. If a repeater connection is identified, no further packets need be sent out of this link.

If the first test packet is sent but is not received on the other link(s) being tested, a second test is performed to check for a bridged connection. A second test packet that uses a broadcast DA, a multicast DA, or a non-existent unicast DA is sent. If this second test packet is received on another link or links, a bridging device loop is indicated because a bridge is required to forward all broadcast, multicast, and unknown unicast packets to allow them to reach their ultimate (unknown to the bridge) destination.

The invention detects multiple bridged or repeated connections that are directly attached to the target device. The connections must be directly attached to the device (e.g. They must be end-nodes to that environment, rather than remote to it). Additionally, the invention can qualify the type of connection only when two or more of the target device's hardware links are somehow connected via the same bridge or repeater. This is because a physical loop is required to provide the information for the invention's verification procedure. The existence of such physical loop, however, does not identify the type of connection. The type of connection is identified by the verification procedure.

The potentially looping configuration is not retained during the attempt to diagnose the loop. Such a looping configuration could prevent the test packets from getting out on the network, rendering the test unreliable. To ensure that the configuration is not retained, the invention uses a hardware environment in which the device is not repeating traffic between input and output link(s). In the preferred embodiment of the invention, the hardware environment is a multi-segment repeater.

The use of a hardware environment that prevents repeating of traffic between input and output links allows packets to be sent out one link at a time, thereby preventing collisions with other enabled links. The packet, and any other traffic, is prevented from looping around while the test is occurring. This increases the ease and reliability of methods for determining whether the same packet is seen on the other link(s), including the prior art SNMP method, as well as the invention.

Figure 3:
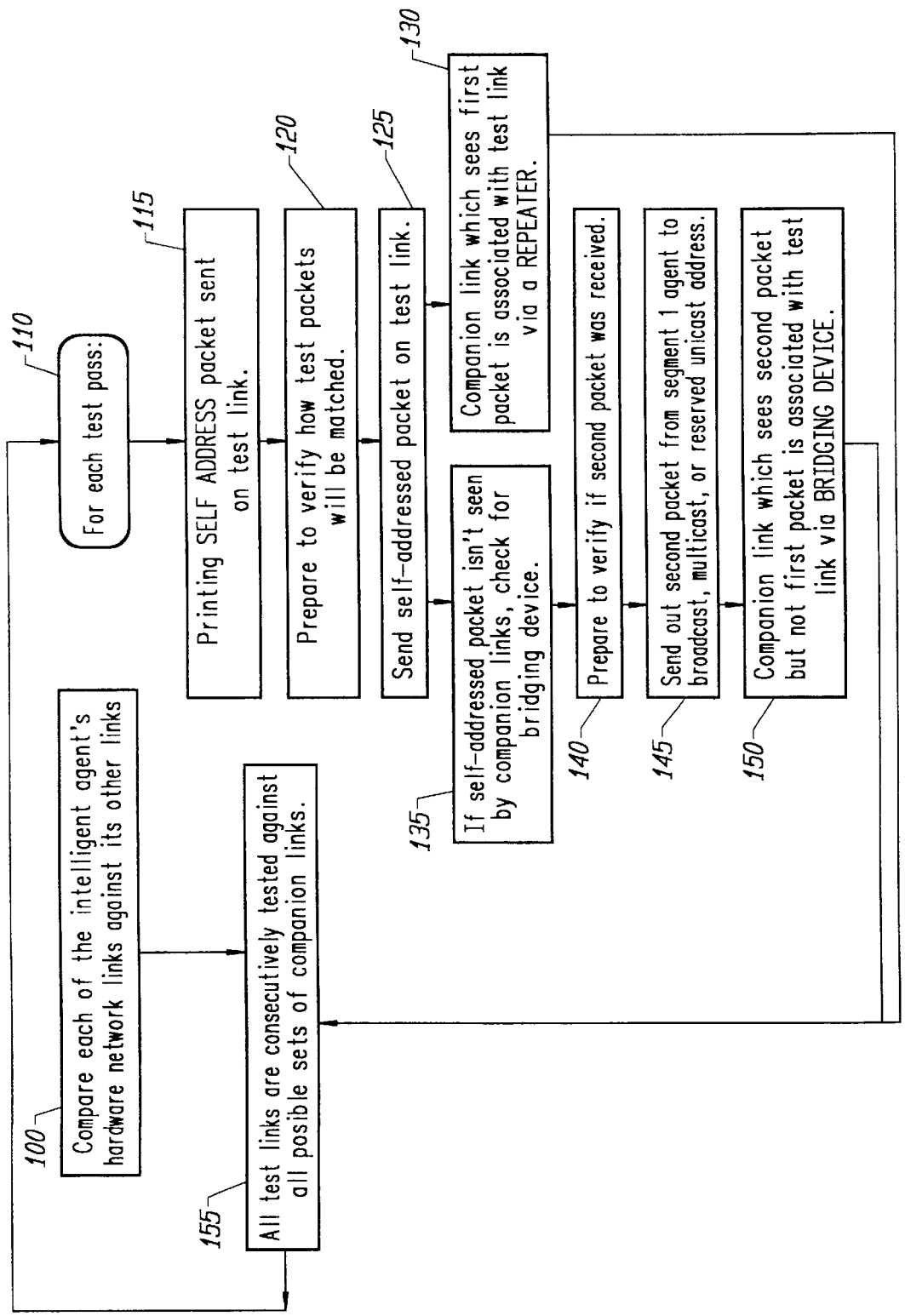
FIG. 3 is a flowchart of the algorithm used for detection of attached devices according to a preferred embodiment of the invention.

An algorithm is used for detection of attached devices. This algorithm discovers the general topology directly connected to the agent's hardware environment. FIG. 3 is a flowchart of the algorithm used for detection of attached devices, according to a preferred embodiment of the invention.

Each of the target device's hardware network links is first compared to its other links (100). The comparison starts with Link 1 as the test link on the first network segment 1. Link I is tested against all possible sets of companion links (155). A set of companion links includes, for example, a single link, such as Link 2 on segment 2 or segment 3, or on any other network segment available in the target device's hardware environment other than segment 1. The set may also comprise multiple links, such as Link 2 on segment 2, Link 3 on segment 3, and link M on segment M.

The preferred embodiment of the invention is used with a four-segment hardware environment. In this four-segment environment, the first set of companion links for Link 1 is {Links 2,3,4 on Segments 2,3,4, respectively} and the second set of companion links for Link 1 is {Links 5,6,7 on Segments 2,3,4, respectively}. Subsequent sets of companion links are similarly determined.

As an example, Link 1 may be tested against Links 2 through M individually. Preferably, Link I is tested against other sets of companion links in the following sequence, where Q is the total number of segments in the target device's hardware environment:

1. Links 2, 3, . . . , Q
2. Links Q+1, Q+2, . . . , Q+Q
3. Links 2Q+1, 2Q+1, . . . , 2Q+Q, etc.

Then Link 2 would be tested against Link 3 through M, and then Link 3 tested against links 4 through M, and so on.

For each test pass (110), the test link and its companion link(s) are enabled and the invention prepares to check the companion link(s) to determine whether the test packets that are sent out have been received (120). In one embodiment of the invention, this verification is accomplished by directly examining packets received on the other links. However, the preferred embodiment of the invention uses hardware address matching of a unique intelligent agent address. Such hardware address matching requires less processing and is therefore more reliable in networks where traffic (and thus, demand on the intelligent agent) is heavy.

To initiate the hardware address matching, a priming self-addressed packet is sent out on the test link (115). In this priming packet, both SourceAddress and DestinationAddress match the sending agent's station address. If any bridging device is attached to this link, the priming packet causes the device to learn the agent's address so that the results of the remainder of the test are correct.

Preparation is made for verifying how the test packets to be sent out are to be matched against any packets received on the other links (120). A self-addressed, test packet is then sent out on the test link (125). A bridging device would see that the destination node is already on the segment that the packet came from and would filter that self-addressed packet. Bridges forward if the destination is not on the originating segment, and they filter when the destination is on the originating segment. The function of a bridge is to limit packets such that they only go on those segments which are needed. Thus, any companion link(s) which sees the self-addressed packet is associated with the test link via a repeater (130) because a bridge would not have forwarded that packet but a repeater forwards all packets. This information is noted for later use.

If the self-addressed packet is not seen by a companion link(s), the software checks whether the test link is connected to the companion link(s) via a bridging device (135). Preparations are made for verifying whether a second test packet has been received (140). A second test packet is then sent from the segment 1 agent to one of the broadcast address, a multicast address, or a reserved unicast address (145). It is preferable to use a reserved unicast address because there is lesser likelihood that any device overhearing the second packet attempts to process it. This is because all nodes would process a broadcast packet; a unicast packet is only processed by the node owning the unicast address, which in this case is no node.

Any companion link(s) which sees the second test packet but did not see the first self-addressed packet is associated with the test link via a bridging device (150). This information is noted for later use.

All test links are then consecutively tested against all possible sets of companion links (155). Thus, when Link 1 has been tested against all possible sets of companion links, Link 2 on Segment 1 is used as the test link (155). This process is continued consecutively until all of the test links 1 . . . M have been compared against all of their (testLink+1 . . . Q, Q+1 . . . Q+Q, 2Q+1 . . . 2Q+Q, etc.) possible companions. Redundant testing with earlier-tested Links is skipped.

FIG. 5 lists the results from the test of whether a link is bridged to other links or repeated to other links. The data of FIG. 5 should be interpreted according to the pseudo-code listed in Table 1 below:

TABLE 1

If any repeater is in the test link's row, the connection is repeated, through the same repeater number.

If any BridgingDevice but no repeater is in the test link's row, the connection is Bridged, through the same bridge number.

If a different test link identified this test link as connecting to it via a repeater, then this test link is connected via that same repeater.

If a different test link identified this test link as connecting to it via a BridgingDeviceN, then this test link is connected (perhaps indirectly) via that same BridgingDeviceN (Repeater takes precedence).

A RepeaterN is a link which has been identified as being connected to a repeater. A BridgingDeviceN is a link which has been identified as being connected to a bridge.

The preferred embodiment of the invention uses an algorithm which is optimized to reduce the number of test packets that must be sent. A pseudo-code form of this algorithm is listed in Table 2 below.

In the algorithm, any bridge is really a "bridge set," and any repeater is really a "repeater set." This algorithm is not a general purpose topology algorithm, in that individual bridges within a "bridge set" performing a bridging operation between a set of links connected to the target device are not identified. For example, in FIG. 4, bridge B11 could in actuality be two or more separate bridges. However, for the purposes of network loop detection and this algorithm, they act as a single logical bridge. The same concept applies to repeaters.

TABLE 2

```
Variables:
connTO [row,col] = array indicating if there is a Bridge(B)or
        Repeater (R) between the two links indicated by row, col.
connToR [link] = Repeater number which this link is connected to.
connToB [link] = Bridge number which this link is connected to.
for this Link = 1 to numLinks
   {
   if thisLink is not an end-node Link
      /* !! look at count of source address changes on thisLink */
      {
      if (connTO [any previously tested link, thisLink] = "R")
         {
         copy connTO[] row for that link into our row.
         connToR [thisLink] = connToR [that previous link]
         break; /* <<NOTE: we don't do any test packets in this case! */
         }
      send out priming packet so any bridging device attached to
            thisLink learns the address and will filter/forward correctly
      do search address test using a unicast packet which only repeaters
            forward; send packet as many times as required to test against
            the remaining (thisLink+1 . . M links), filling in the connTO[]
            row for thisLink
      if any repeater associations found
      {   /* A new repeater was found. */
         connToR [thisLink] = first link on which the association was found
      }
      if connTO [any previously tested link, thisLink] = "B"
      {
         copy the "B" entries of connTO[] row for that link into the
```

TABLE 2-continued

```
            connTO row for this link, but do not overwrite any Rs with a B.
            connToB [thisLink] = connToB [that previous link]
            break; /* <<NOTE: we avoid the bridge test packets in this case! */
            }
        else
            {
            do search address test using (preferably) a reserved non-existent
                unicast-addressed packet(or a broadcast/multicast packet) which
                bridges will forward. Send packet as many times as required to
                test against the remaining (thisLink+1 . . M links), filling in the
                connTO row for this link. Do not overwrite any Rs with a B.
                if any bridge association found
                { /* A new bridge was found */
                    connToB [thisLink] = first link on which association was found
                }
            }
        }
    }
}
```

FIG. 4 is a diagram showing a first sample topology for a hardware environment, according to the invention. The sample agent hardware environment 30 is a four-segment Repeater with twelve network links L1–L12. The intelligent network agent software 32 of the invention is embedded in the target device's hardware environment. The hardware environment also is directly attached to sets of Repeating devices R2, R7, R9 and Bridging devices B4, B11, B12.

Figure 4A:
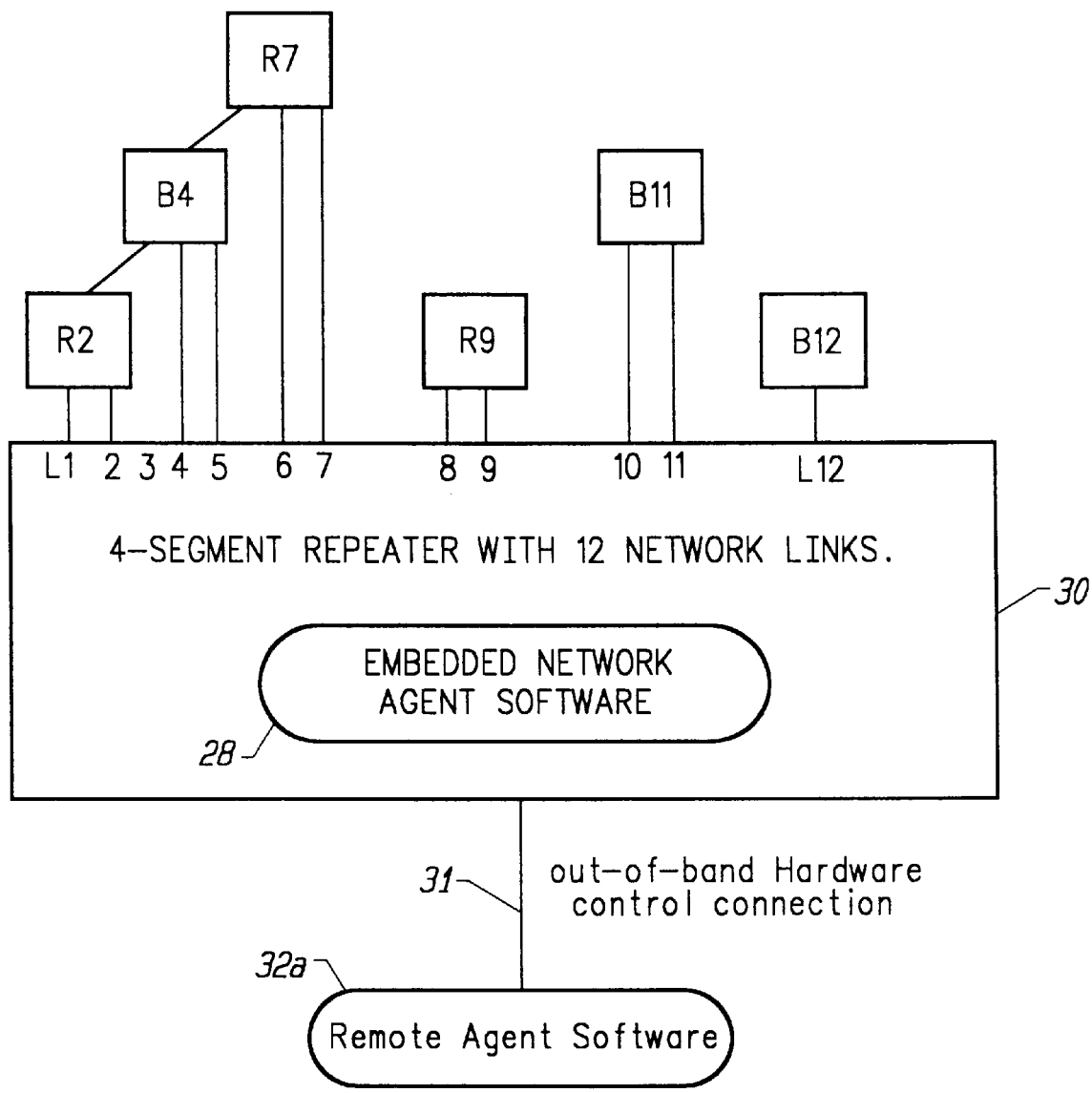
FIG. 4a is a diagram showing a first sample topology for a hardware environment according to an alternate embodiment of the invention.

FIG. 4a is a diagram showing a first sample topology for a hardware environment according to an alternate embodiment of the invention. The sample agent hardware environment 30 is a four-segment Repeater with twelve network links L1–L12. The remote network agent software 32a of the invention is in communication with embedded software intelligence 28 in the target device's hardware environment via an out-of-band hardware control connection 31. The hardware environment also is directly attached to sets of Repeating devices R2, R7, R9 and Bridging devices B4, B11, B12.

FIG. 5 is a chart of the results from a test for automatically detecting bridged or repeated connections in that first sample topology, according to the invention. In the chart, connTo represents the array 34 indicating if there is a Bridge or Repeater between any two links.

For example, link L1 is tested against companion links L2 through L12. Repeating device R2 is shown connecting L1 to L2, while bridging device B4 is shown connecting L1 to L4–L7. The other links are similarly tested and the repeating device information, connToR 36 and bridging device information, connToB 38 is stored. The information in the results row 40 of FIG. 5 denotes precisely, from the target device's hardware environment view, what kind of device connection attaches each link to the rest of the remaining links. This information approximates the type of devices attached to each of the target device's links.

Figure 6:
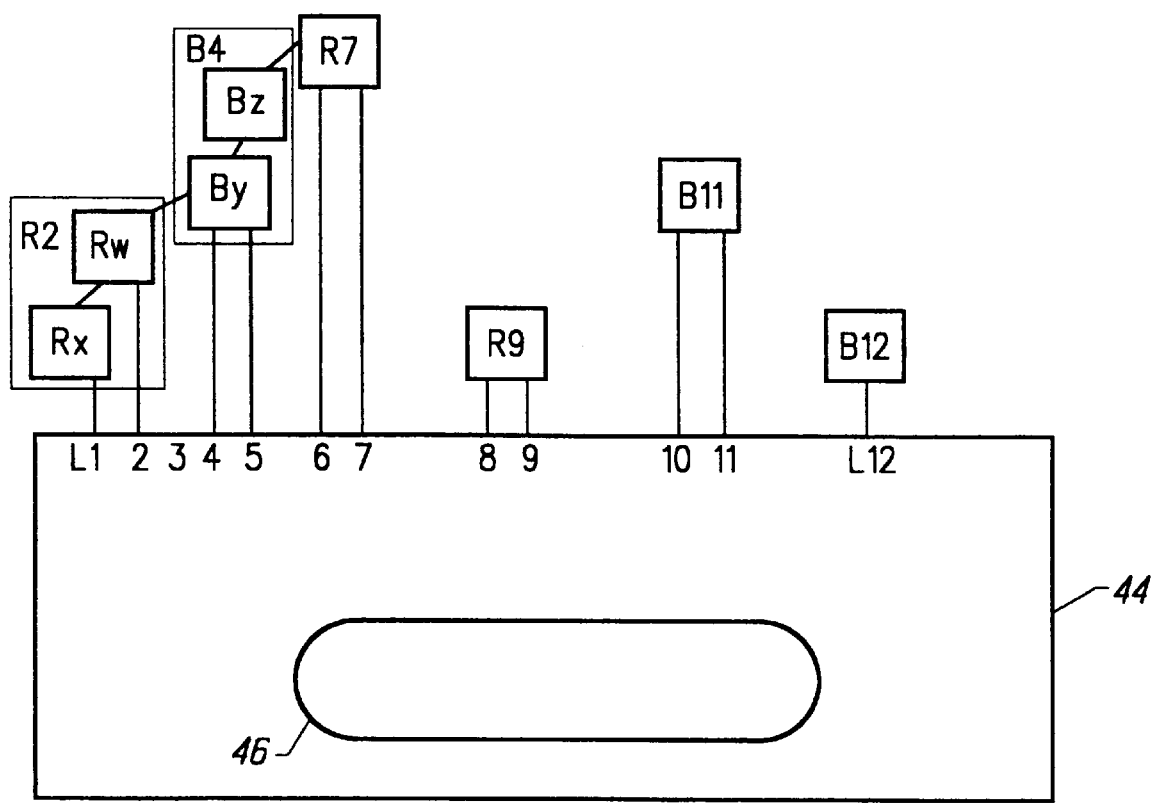
FIG. 6 is a diagram showing a second sample topology for a hardware environment according to the invention.

The Repeaters and Bridges shown in FIG. 4 govern the connections between the links. Thus, while there may be other devices between these links in the target device's hardware environment that the agent is not able to detect, these devices do not determine the communication patterns between the links. An example of such devices is shown in FIG. 6, which is a diagram showing a second sample topology for a hardware environment according to the invention. The second sample topology includes a 4-segment repeater 44 with 12 network links, L1–L12, and embedded intelligent network agent software 46 according to the invention.

In FIG. 6, repeaters Rw and Rx are not detected individually. Together, they are logically behaving as a single repeater, which is detected as R2. Likewise, By and Bz are behaving as a single bridge, detected as B4. Rw governs communication between Link1 and Link2. By governs communications between {Link1} and {Link4, Link5, Link6, and Link7}} and {{Link2} and {Link4, Link5, Link6, and Link7}} but not between {{Link6} and {Link7}}. The algorithm treats a set of interconnected bridges, e.g. By and Bz, as one, regardless of which bridge is "governing" the connection. Thus, although each bridge may be governing connectivity, they are treated as a single bridge by the algorithm.

Therefore, the invention does not determine actual topology. Rather, it perceives topology from the target device's point of view. This information is sufficient for any intelligent agent features as applied to the target device's portion of the network.

Although the invention is described herein with reference to the preferred embodiment, one skilled in the art will readily appreciate that other applications may be substituted for those set forth herein without departing from the spirit and scope of the present invention.

The invention detects information that can be used by the intelligent agent or other applications to automatically fix network problems and/or offer users new "ease-of-use" features. No user action is required for such detection. For example, this information can be used to automatically configure network links, or to assign bridged links to different segments to maximize the connectivity offered by the bridging and to prevent looping. The information may additionally be used in setting up bridged links on a bridge to form a Spanning Tree with another bridge, for setting up redundant connections, and for disabling ports which are causing loops in the network.

The invention is able to detect bridged or repeated connections between the target device's network links, so long as the device types governing those connections are standard network bridging or repeating devices. This includes devices which have no software and those with software which do not otherwise support the SNMP System Group MIB information required in the prior art solution. Furthermore, the invention functions in adverse network environments in which the prior art is unreliable or unsuccessful.

The invention may be used with any suitable network system, including the AdvanceStack Switching Hub systems of Hewlett-Packard Company, Palo Alto, Calif.

The invention is operable in response to manual or automatic triggering to check for bridged or repeated device connections. Automatic triggering includes external or internal software applications, or general policies of the agent software configuration. Thus, the check may be performed as desired, at pre-determined times, or in response to detected operating conditions.

Accordingly, the invention should only be limited by the claims included below.

We claim:

1. A method for automatically detecting bridged or repeated device connections to a network device, comprising the steps of:
   evaluating said network device with an intelligent network agent;
   identifying a loop between at least two links with said intelligent network agent; and
   verifying the type of devices governing said loop sending out test packets that are qualified with regard to at least any sequences method of transmission, and content with said intelligent network agent; and
   optimizing to reduce the number of test packets that must be sent, wherein said optimizing step comprises an algorithm.

2. The method of claim 1, wherein said intelligent network agent is embedded in an intelligent network agent hardware environment.

3. The method of claim 1, wherein said intelligent network agent is remotely connected to the hardware environment via an out-of-band hardware control connection.

4. The method of claim 1, wherein the verifying step comprises the step of identifying one of a bridged or a repeated connection in said loop.

5. The method of claim 1, further comprising the step of removing said loop configuration during said verifying step.

6. The method of claim 5, wherein said removing step comprises the step of providing a hardware environment in which said network device is not repeating traffic between an input and an output link.

7. The method of claim 6, wherein said hardware environment is at least any one of a network bridge, switch, router, repeater, or multi-segment repeater.

8. The method of claim 1, further comprising the step of verifying specific test packets being received by the intelligent agent in a particular order.

9. The method of claim 8, wherein the method used to verify said packets consists of hardware address matching.

10. The method of claim 1, wherein said method is operable in response to one of manual or automatic triggering.

11. The method of claim 1, further comprising the step of:
   determining whether a link is bridged to other links, repeated to other links, or neither bridged nor repeated to other links.

12. The method of claim 1, wherein said optimizing step is accomplished in accordance with the following algorithm:
   if any repeater is in a test link's row, the connection is repeated through the same repeater number;
   if any BridgingDevice but no repeater is in the test link's row, the connection is Bridged through a same bridge number;
   if a different test link identified this test link as connecting to it via a repeater, then this test link is connected via that same repeater; and
   if a different test link identified this test link as connecting to it via a BridgingDeviceN, then this test link is connected via that same BridgingDeviceN.

13. The method of claim 1, further comprising the step of:
   using information obtained during said verification step to configure network links automatically by at least any one of the following:
   assigning bridged links to different segments to maximize the connectivity offered by the bridging and to prevent looping;
   setting up bridged links on a bridge or switch to form a Spanning Tree with another bridging device;
   setting up redundant connections; and
   disabling ports which are causing loops in the network.

14. The method of claim 1, wherein said method is implemented in a standard network that comprises existing general purpose devices.

15. The method of claim 1, wherein said test packet uses a reserved unicast address that is only processed by a node owning the unicast address.

16. A method for automatically detecting bridged or repeated device connections to a network device, comprising the steps of:
   evaluating said network device with an intelligent network agent;
   identifying a loop between at least two links with said intelligent network agent;
   verifying the type of devices governing said loop sending out test packets that are qualified with regard to at least any of sequence, method of transmission, and content with said intelligent network agent; and
   optimizing to reduce the number of test packets that must be sent, wherein said optimizing step comprises the following algorithm

---

Variables:
connTO [row,col] = array indicating if there is a Bridge (B) or
    Repeater (R) between the two links indicated by row, col;
connToR [link] = Repeater number which this link is connected to;
connToB [link] = Bridge number which this link is connected to;
for this Link = 1 to numLinks
{
    if thisLink is not an end-node Link
    {
        if (connTO [any previousiy tested link, thisLink] = "R"
        {
            copy connTO[] row for that link into our row.
            connToR [thisLink] = connToR [that previous iink]
            break;
        }
        send out priming packet so any bridging device attached to
            thisLink learns the address and will filter/forward
    correctly;
        do search address test using a unicast packet which only
    repeaters
            forward; send packet as many times as required to test
    against     the remaining (thisLink+1 . . M links) , filling in the
    connTO[]    row for thisLink;
        if any repeater associations found
        {
            connToR [thisLink] = first link on which the association was
    found
        }
        if connTO [any previously tested link, thisLink] = "B"
        {
            copy the "B" entries of connTO[] row for that link into the
                connTO row for this link, but do not overwrite any Rs with
    a B;
            connToB [thisLink] = connToB [that previous link]
            break;
        }
        else
        {
            do search address test using reserved non-existent unicast
    packet (or     a             broadcast/multicast packet) which
    bridges will forward; send    packet as many times as required to test
    against the remaining   (thisLink+1 . . M links), filling in the connTO
    row for this link; do   not overwrite any Rs with a B;
            if any bridge association found -continued

```
        {
            connToB [thisLink] = first link on which association was
found
        }
    }
  }
}
```

17. An apparatus for automatically detecting bridged or repeated device connections to a network device, comprising:
  an intelligent network agent, said intelligent network agent comprising:
    means for evaluating said network device;
    means for identifying a loop between at least two links of said network device; and
    means for identifying one of a bridged or a repeated connection in said loop;
    wherein said intelligent network agent further comprises an algorithm which is optimized to reduce the number of test packets that must be sent.

18. The apparatus of claim 17, wherein said apparatus is adapted for operation in a four-segment hardware environment.

19. The apparatus of claim 17, wherein said hardware environment is at least any one of a network bridge, switch, router, repeater, or multi-segment repeater.

20. The apparatus of claim 17, further comprising one of manual or automatic triggering means.

21. The apparatus of claim 17, wherein said hardware environment is an environment in which said network device is not repeating traffic between an input and an output link.

22. The apparatus of claim 17, wherein said intelligent network agent further comprises:
  means for sending out test packets that are qualified with regard to at least any of sequence, method of transmission, and content with said intelligent network agent.

23. The apparatus of claim 22, said intelligent network agent further comprising:
  means for verifying specific test packets being received by the intelligent agent in a particular order.

24. The apparatus of claim 23, wherein said packet verification is accomplished by hardware address matching.

25. The apparatus of claim 22, wherein said test packet uses a reserved unicast address that is only processed by a node owning the unicast address.

26. The apparatus of claim 17, said intelligent network agent further comprising:
  means for determining whether a link is bridged to other links, repeated to other links or neither bridged nor repeated to other links.

27. The apparatus of claim 17, wherein said intelligent network agent further comprises:
  means for identifying a connection in said loop in accordance with the following algorithm:
    if any repeater is in a test link's row, the connection is repeated through the same repeater number;
    if any BridgingDevice but no repeater is in the test link's row, the connection is Bridged through a same bridge number;
    if a different test link identified this test link as connecting to it via a repeater, then this test link is connected via that same repeater; and
    if a different test link identified this test link as connecting to it via a BridgingDeviceN, then this test link is connected via that same BridgingDeviceN.

28. The apparatus of claim 17, wherein said intelligent network agent further comprises an algorithm which is optimized to reduce the number of test packets that must be sent.

29. The apparatus of claim 17, wherein said intelligent agent uses information obtained during said evaluation to configure network links automatically by at least any one of the following:
  means for assigning bridged links to different segments to maximize the connectivity offered by the bridging and to prevent looping;
  means for setting up bridged links on a bridge or switch to form a Spanning Tree with another bridging device;
  means for setting up redundant connections; and
  means for disabling ports which are causing loops in the network.

30. The apparatus of claim 17, wherein said apparatus is adapted to be implemented in a standard network that comprises existing general purpose devices.

31. The apparatus of claim 17, wherein loop configuration is removed by said intelligent network agent by a verifying means.

32. An apparatus for automatically detecting bridged or repeated device connections to a network device, comprising:
  an intelligent network agent, said intelligent network agent comprising:
    means for evaluating said network device;
    means for identifying a loop between at least two links of said network device; and
    means for identifying one of a bridged or a repeated connection in said loop;
    wherein said intelligent network agent further comprises an algorithm which is optimized to reduce the number of test packets that must be sent, wherein said algorithm comprises the following:

```
Variables:
connTO [row,col] = array indicating if there is a Bridge (B) or
    Repeater (R) between the two links indicated by row, col;
connToR [link] = Repeater number which this link is connected to;
connToB [link] = Bridge number which this link is connected to;
for this Link =1 to numLinks
{
    if thisLink is not an end-node Link
    {
        if (connTO [any previously tested link, thisLink] = "R"
        {
            copy connTO[] row for that link into our row.
            connToR [thisLink] = connToR [that previous link]
            break;
        }
        send out priming packet so any bridging device attached to
            thisLink learns the address and will filter/forward
correctly;
        do search address test using a unicast packet which only
repeaters
            forward; send packet as many times as required to test
against     the remaining (thisLink+1 . . M links) , filling in the
connTO[]    row for thisLink;
        if any repeater associations found
        {
            connToR [thisLink] = first link on which the association was
found
        }
        if connTO [any previously tested link, thisLink] = "B"
```

```
        {
        copy the "B" entries of connTO[] row for that link into the
                connTO row for this link, but do not overwrite any Rs with
a B;

connToB [thisLink] = connToB [that previous link]
        break;
        }
    else
        {
        do search address test using reserved non-existent unicast
packet (or        a                broadcast/multicast packet) which
bridges will forward; send        packet as many times as required to test
against the remaining    (thisLink+1 . . M links), filling in the connTO
row for this link; do      not overwrite any Rs with a B;
        if any bridge association found
            {
                connToB [thisLink] = first link on which association was
found
            }
        }
    }
}
```

* * * * *